P. KLIMCOW.
NOODLE CUTTING MACHINE.
APPLICATION FILED MAR. 27, 1918.
1,288,923.
Patented Dec. 24, 1918.
2 SHEETS—SHEET 1.
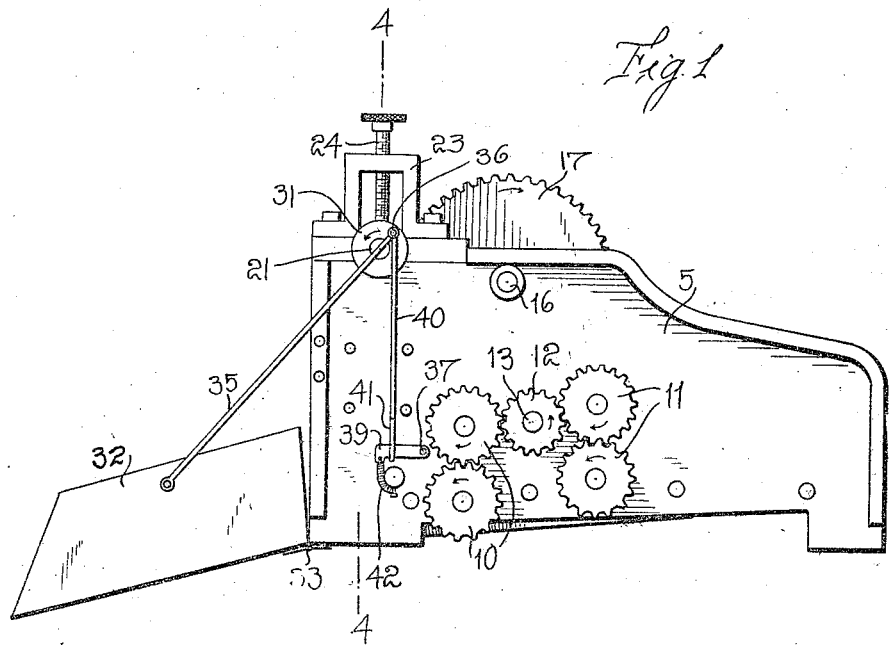
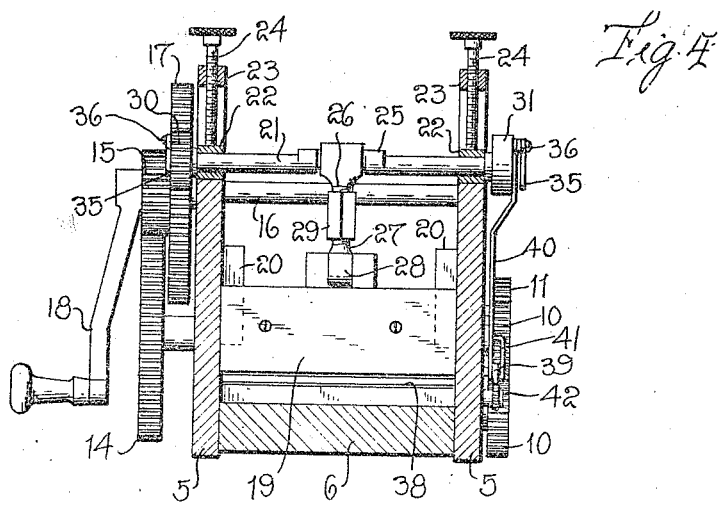
Inventor
Peter Klimcow
By Watson E. Coleman
Attorney

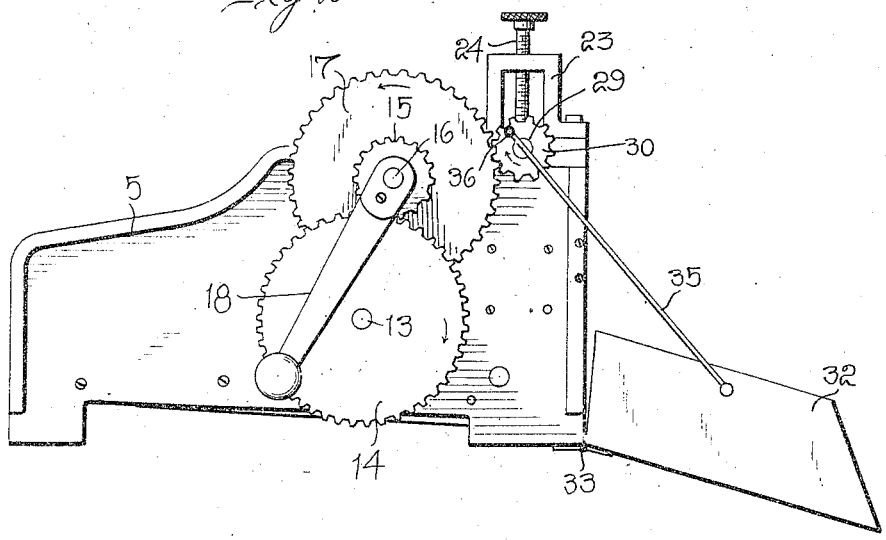
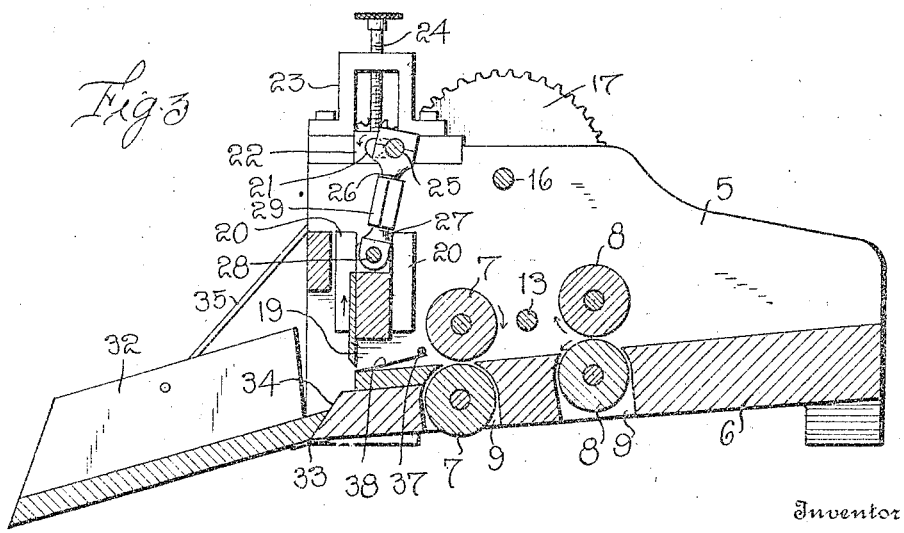

UNITED STATES PATENT OFFICE.

PETER KLIMCOW, OF ROCHESTER, NEW YORK.

NOODLE-CUTTING MACHINE.

1,288,923.     Specification of Letters Patent.     Patented Dec. 24, 1918.

Application filed March 27, 1918. Serial No. 225,089.

*To all whom it may concern:*

Be it known that I, PETER KLIMCOW, a citizen of the United States, residing at Rochester, in the county of Monroe and State of New York, have invented certain new and useful Improvements in Noodle-Cutting Machines, of which the following is a specification, reference being had to the accompanying drawings.

This invention relates to an improved noodle cutting machine and has for its primary object to provide means for quickly and accurately cutting dough into flat strips of predetermined width.

It is another and more particular object of the invention to provide a machine for the above purpose having pairs of rollers for reducing the dough mass to a predetermined thickness, a reciprocating cutting knife to cut the dough into strips, a trough to receive the strips, and means for vibrating the trough to assure the continuous discharge of the dough strips therefrom.

It is also another object of the invention to provide an automatically operated scraper for removing the dough sheet from the face of the cutting knife.

It is a further general object of my invention to provide a machine for the above purpose which is designed for use either in hotels or domestic establishments, which is effective and reliable in its operation, simple in construction and capable of manufacture at relatively small cost.

With the above and other objects in view the invention consists in the improved combination, construction and relative arrangement of the several parts as will be hereinafter more fully described, subsequently claimed and illustrated in the accompanying drawings in which similar reference characters designate corresponding parts throughout the several views, and wherein—

Figure 1 is a side elevation illustrating the preferred embodiment of my invention;

Fig. 2 is an elevation looking at the opposite side of the machine;

Fig. 3 is a longitudinal section; and

Fig. 4 is a sectional view taken on the line 4—4 of Fig. 1.

Referring in detail to the drawings 5 designates the two side plates of the body of the machine between the lower edges of which a platform 6 is arranged and securely fixed. Longitudinally spaced pairs of rollers designated 7 and 8 respectively are also arranged between the side plates 5, the roller trunnions being journaled in suitable bearings in the side plates. The lower roller in each pair operates in an opening indicated at 9 in the platform 6, and it will be noted that the lower roller 8 in the rear pair projects slightly above the plane of the upper surface of the platform 6 while the periphery of the lower roller 7 in the forward pair at the upper side of the roller is disposed substantially in the same plane as the upper surface of the platform. The upper and lower rollers of each pair are connected for rotation through the medium of the gears designated 10 and 11 respectively, said gears being located adjacent the outer face of one of the side plates 5. The upper gears 10 and 11 are connected through the medium of an intermediate pinion 12 fixed upon one end of a shaft 13 journaled in the side plates 5.

On the opposite end of the shaft 13 a large gear wheel 14 is fixed and meshes with a relatively small gear 15 secured upon one end of a transverse shaft 16 which is journaled in the side plates 5 adjacent their upper edges. A large gear wheel 17 is also fixed upon the shaft 6 for a purpose to be presently stated.

18 designates the crank or operating handle secured upon the end of the shaft 16. Upon the operation of this gear mechanism, it will be readily understood that through the medium of the pinion 12 the rear pair of rollers 8 are rotated to feed the dough mass disposed between the side plates 5 in a forward direction to the forward pair of rollers 7. These rollers are also positively rotated through the medium of the gears 12 and 10, and act upon the dough to reduce it to a predetermined thickness and continue its forward movement through the machine.

Forwardly of the rollers 7, a knife blade 19 is mounted to reciprocate vertically in suitable guides indicated at 20 on the inner face of the side plates 5. A shaft 21 is journaled at its ends in boxes or bearings 22 mounted in the vertically disposed guide yokes 23 secured to the upper edges of the plates 5. Adjusting screws 24 have threaded engagement in the guide yokes and are connected to the shaft bearings 22. Thus it will be understood that by means of the screws 24 the shaft 21 may be readily raised or lowered. This shaft is provided intermediate its ends with a crank 25 to which one section of a connecting rod 26 is connected. The other section of this rod indicated at 27 is pivotally connected as at 28 to the upper edge of the knife blade 19. A turn buckle 29 has threaded connection with the rod sections 26 and 27 and by the adjustment of this turn buckle, it will be understood that the knife blade can be properly adjusted or positioned with respect to the axis of the shaft 21.

Upon one end of the shaft 21 a pinion 30 is fixed and meshes with the large gear wheel 17 on the shaft 16. Through the medium of this pinion the shaft is rotated and the knife 19 reciprocated vertically. By merely substituting larger or smaller gears for the pinion 30, the rapidity of reciprocation of the knife blade may be regulated as desired.

Upon the other end of the shaft 21 a disk 31 is fixed. 32 designates a receiving trough for the dough strips which is hinged as at 33 to the forward end of the platform 6. The platform at its end is beveled as at 34, and the dough strips gravitate downwardly over this inclined edge of the platform into the trough 32. To the side walls of the trough the lower ends of rods 35 are pivotally connected. The upper ends of these rods are eccentrically connected to the gear 30 and the disk 31 respectively as shown at 36. Thus it will be apparent that in the rotation of the shaft 21, the trough 32 is vertically vibrated so as to agitate the dough strips and cause them to move downwardly over the inclined base wall of the trough to be finally discharged from the lower end thereof.

In the side plates 5 adjacent their lower edges and between the knife blade 19 and the forward pair of rollers 7, a rod or shaft 37 is journaled at its ends. To this shaft one edge of a scraper plate 38 is fixed. An angular arm 39 is secured to one end of the shaft 37 adjacent the outer side of one of the plates 5, said arm having a lateral projecting portion engaged in a loop 41 formed in the lower end of the vertical rod 40, the upper end of which is connected to the eccentric pivot fixed in the disk 31. A coil spring 42 connected to the arm 39 acts to retain said arm in operative engagement with the rod 40.

From the above description of the several parts of my improved machine, its operation will be readily understood. When the crank or handle 18 is rotated the dough is flattened out to a predetermined thickness and fed forwardly through the machine as above explained. The knife 19 in the downward stroke thereof cuts a narrow strip from the dough mass. The width of these strips is predetermined by regulating the rapidity of reciprocation of the knife blade and vertically adjusting said blade in the manner above stated. The dough, particularly if it is quite moist, will adhere to the knife blade. Therefore, in the upward movement of the blade, the scraper plate 38 will be actuated through the medium of the rod 40 and the free longitudinal edge of this plate is engaged against the rear face of the knife blade. Thus in the downward movement of the plate 38 under the action of the spring 42, the dough sheet is engaged and removed from the rear face of the cutting blade so that it will return to its normal position upon the surface of the platform 6 and be directed by the rollers 7 beneath the knife blade. In this manner, it will be perceived that by means of a very simple mechanism a large mass of dough may be cut up into strips of predetermined width and thickness. After the dough has been cut in this manner, it may be reduced to particles of still smaller size by cutting the strips cross-wise. As above noted the several gears and pinions may be of any desired ratio so as to feed the dough through the machine at proper speed and also cut the same into strips of the desired width. The several elements of the mechanism are likewise susceptible of considerable modification and it is therefore to be understood that I reserve the privilege of adopting all such legitimate changes as may be fairly embodied within the spirit and scope of the invention as claimed.

I claim:

1. In a machine of the character described, means for reducing a plastic mass to sheet form of predetermined thickness and for longitudinally feeding the sheet, a cutting knife disposed in spaced relation to said means to cut the sheet into strips of predetermined width, a plate pivotally mounted adjacent to the cutting knife and having scraping engagement with the face of said knife which is opposed to the dough sheet, and means for positively actuating said plate to cause the same to engage and remove the adhering dough from the face of the cutting knife.

2. In a machine of the character described, means for reducing a plastic mass to sheet form of predetermined thickness and for longitudinally feeding the sheet, a cutting knife disposed in spaced relation to said means to cut the sheet into strips of predetermined width, an oscillatable plate arranged between said first named means and the cutting knife and adapted for engagement with the face of the knife blade to remove the plastic sheet which may adhere thereto after the strip has been cut, and means for actuating said plate.

3. In a machine of the character described, spaced parallel pairs of feeding rollers for reducing a plastic mass to sheet form and feeding the sheet longitudinally, a vertically reciprocating cutting knife arranged in spaced relation to said rollers, means for actuating said knife, a movable scraper element mounted between the cutting knife and said rollers and adapted to engage the face of the knife blade to remove the plastic sheet therefrom after the sheet has been cut, and means for actuating said scraper plate.

4. In a machine of the character described, spaced parallel side plates, means for reducing a dough mass to sheet form of predetermined thickness and feeding the sheet longitudinally between said side plates, a vertically reciprocating knife to cut the sheet into strips of predetermined width, manually operable means for actuating the feeding means and said knife, additional automatically actuated means for removing the adhering dough sheet from the face of the knife, a hinged receiving trough for the dough strips, and means for vertically vibrating said trough to insure the gravity movement of the dough strips through the trough.

5. In a machine of the character described, spaced parallel side plates, means for reducing a dough mass to sheet form of predetermined width and feeding the same longitudinally between said plates, a knife blade mounted between the side plates for vertical reciprocation, a crank shaft, an adjustable connection between the crank of said shaft and the knife blade, gearing for actuating the feeding means and the crank shaft, a vibratory receiving trough for the dough strips movable with respect to the knife blade, and means for vibrating said trough.

6. A machine of the character described including means for reducing a mass of dough to predetermined thickness and for feeding the dough sheet, a vertically reciprocating knife, a crank shaft, an operating connection between the crank shaft and the knife blade, a hinged trough to receive the dough strips, and rods eccentrically connected to the crank shaft and to said trough to vibrate the latter and insure the discharge movement of the dough strips through said trough.

In testimony whereof I hereunto affix my signature in the presence of two witnesses.

PETER KLIMCOW.

Witnesses:
 ANDREW ONREFREJK,
 MICHAEL JURKIW.